United States Patent [19]
Brask et al.

[11] Patent Number: 5,934,843
[45] Date of Patent: Aug. 10, 1999

[54] CLAMPING DEVICE FOR A CUTTING INSERT

[75] Inventors: Karl-Göran Brask, Sandviken; Per Hansson, Gävle, both of Sweden

[73] Assignee: Sandvik Aktiebolag, Sandviken, Sweden

[21] Appl. No.: 09/044,011

[22] Filed: Mar. 19, 1998

[30] Foreign Application Priority Data

Mar. 19, 1997 [SE] Sweden .................................. 9701003

[51] Int. Cl.[6] .................................................. B23B 27/16
[52] U.S. Cl. ........................ 407/106; 407/108; 407/109; 407/110
[58] Field of Search .................... 407/106, 107, 407/108, 109, 110, 66, 91

[56] References Cited

U.S. PATENT DOCUMENTS

| | | | |
|---|---|---|---|
| 1,110,281 | 9/1914 | Amborn | 407/106 |
| 1,169,594 | 1/1916 | Amborn | 407/106 |
| 3,069,937 | 12/1962 | Williams | 407/108 X |
| 4,588,333 | 5/1986 | Gustafson . | |
| 4,801,224 | 1/1989 | Pettersson et al. . | |
| 4,938,640 | 7/1990 | Pano et al. . | |

FOREIGN PATENT DOCUMENTS

| | | | |
|---|---|---|---|
| 3319799 | 12/1984 | Germany | 407/107 |
| 1436143 | 5/1976 | United Kingdom | 407/106 |

*Primary Examiner*—Andrea L. Pitts
*Assistant Examiner*—Henry W. H. Tsai
*Attorney, Agent, or Firm*—Burns, Doane, Swecker & Mathis, L.L.P.

[57] ABSTRACT

A holder for clamping an insert, such as an insert for the turning of grooves and for parting. The holder includes a slot for receiving the insert. A recess is formed in an upper surface of the slot, and a tensioning roller is rotatably mounted in the recess. The roller is rotatable between a position permitting insertion or removal of the insert, and a position clamping the insert in place.

10 Claims, 7 Drawing Sheets

Fig. 5
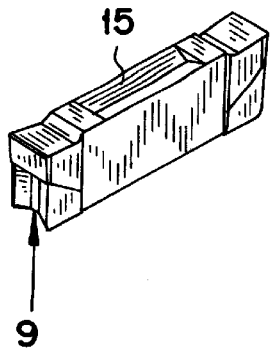
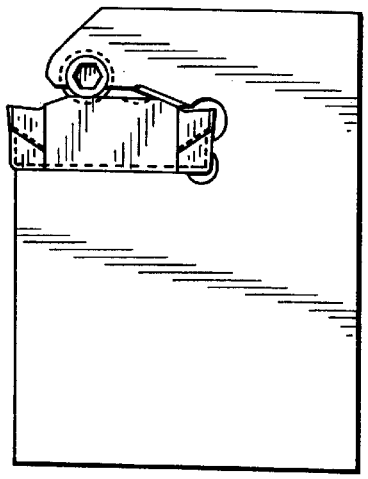
Fig. 6
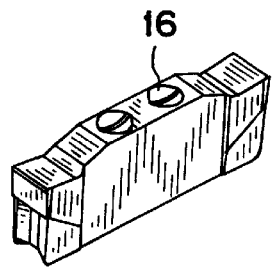
Fig. 7
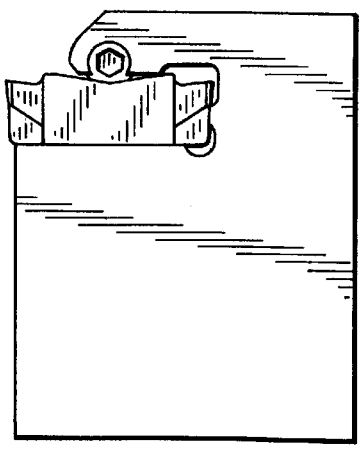
Fig. 8
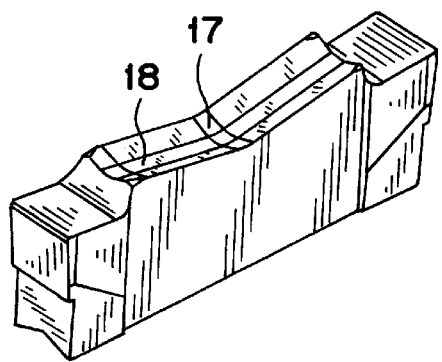
Fig. 9

Fig. 10a
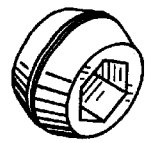
Fig. 10b
 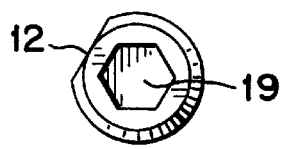
Fig. 10c
Fig. 11a
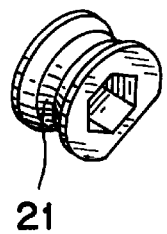
Fig. 11b
 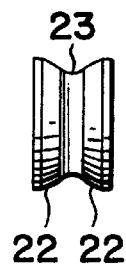
Fig. 11c
Fig. 12b
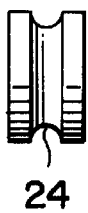  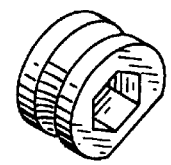
Fig. 12a
Fig. 12c

CLAMPING DEVICE FOR A CUTTING INSERT

BACKGROUND OF THE INVENTION

The present invention relates to a clamping device for a cutting insert, in particular, for an insert for the turning of grooves and parting.

Cutting inserts, for example, for grooving and parting are clamped in holders of the blade type in order to achieve narrow widths of cut. Further, the term "blade type" also includes slitting cutters and circular saw blades.

U.S. Pat. No. 4,801,224 describes a clamping device for a cutting insert in a holder of the blade type, including a cutting insert which can be clamped in a slot in the blade. The cutting insert is clamped by the spring action which is created by deflection of a clamping finger which is an integral part of the holder. In order to press the cutting insert into its correct position in the slot, a special installation tool is used which consists of a rod with two pins in the one end surface. Admitted, this device functions satisfactorily but it nevertheless suffers from certain drawbacks. For example, the cutting insert itself forces the spring clamp finger upwards each time a cutting insert is mounted, causing a certain wear of the contact surfaces of the clamping finger which works against the cutting insert and which, over an extended period, damages the contact surface such that the cutting insert no longer sits with the same stability which it had at the beginning and therefore, the entire blade holder must be exchanged.

Also in U.S. Pat. No. 4,588,333 a clamping device in a blade holder is described, according to which the cutting insert is clamped in a slot by spring action which is created by the deflection of a clamping finger which is integrated into the blade holder. According to this design, the cutting insert is pressed into the insert pocket by the operator by pushing the end surface of a hard rod or bar against the front part of the cutting insert. In a manner similar to that in U.S. Pat. No. 4,801,224 the cutting insert is then prized out by applying one of the two pins on the rod behind the cutting insert and levering it out. Even with this design, the contact surface of the holder which acts against the cutting insert, wears each time a cutting insert is inserted or extracted. Further, even in this case, there is the inconvenience that the installation tool requires space.

European Publication 0 259 847 described a blade holder with a slot for receiving the cutting insert, with an additional slot for the mounting of a clamping screw, which when activated forces the blade part between the two slots and then presses against the cutting insert, whereby the insert is clamped. Certain wear occurs when installing the cutting insert into and removing the cutting insert from the slot in which the insert is to sit. This can cause a disadvantage of the clamping screw by limiting the amount of play and inadequate distribution of clamping force.

German Document No. 33 19 799 describes a design for the clamping of a cutting insert in a blade holder wherein a clamping screw including a roller part presses with increasing radius against a round rod which, in turn, presses against the cutting insert. The design is complicated and does not provide for torque acting inwards into the insert pock to lock the cutting insert firmly with distinct abutment against the rear abutment surface in the slot which receives the insert.

It is, therefore an object of the present invention is to avoid wear of the holder abutment surfaces which work against the cutting insert.

A further object of the present invention is to maintain a large clamping force for the cutting insert during an extended period of time.

Another object of the invention is to attain the most exact positioning of the cutting insert possible when clamping, with distinct abutment against a rear abutment surface in the slot which receives the insert.

SUMMARY OF THE INVENTION

These and other primary objects of the invention are achieved by designing a clamping device for a cutting insert, comprising a slot having a recess formed in one side thereof. A rotatable roller is mounted in the recess and is rotatable between a position permitting insertion/removal of an insert, and a position clamping the insert in place.

BRIEF DESCRIPTION OF THE DRAWING

The objects and advantages of the invention will become apparent from the following detailed description of preferred embodiments thereof in connection with the accompanying drawing in which like numerals designate like elements, and in which:

FIG. 5 shows a cutting insert intended to be mounted in a clamping device according to FIGS. 1–3;

FIGS. 6 and 7 illustrate a further cutting insert intended to be assembled in a clamping device according to FIGS. 1–3;

FIGS. 8 and 9 illustrate a further cutting insert, intended to be mounted in a clamping device according to FIGS. 1–3;

FIGS. 10A, 10B, 10C show the tensioning roller intended to be mounted in a clamping device according to FIGS. 1–3;

FIGS. 11A, 11B, 11C show a further embodiment of a tensioning roller to be used according to the present invention;

FIGS. 12A, 12B, 12C show a further embodiment of a tensioning roller according to the invention;

DETAILED DESCRIPTION OF PREFERRED EMBODIMENT OF THE INVENTION

Figure 1:
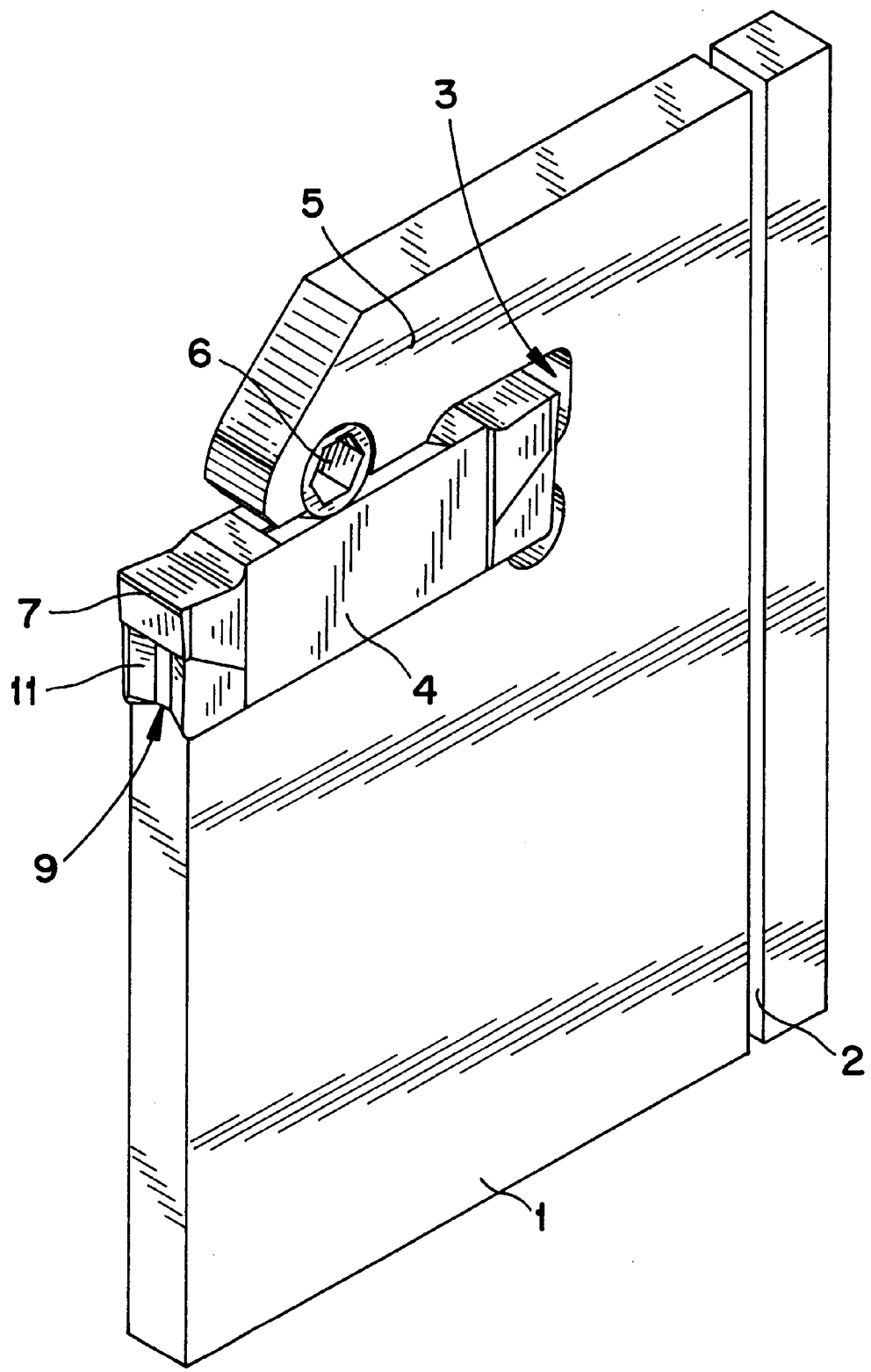
FIG. 1 shows a cutting insert for grooving and/or parting mounted in a clamping device according to the invention, in perspective obliquely from above.

FIG. 1 illustrates a blade holder 1 which blade holder, like those in the remaining figures, can be of any length desired as illustrated in section 2.

The upper corner of the forward end of the blade holder provides for a recess or a slot 3, in which a cutting insert 4 can be inserted and clamped. The blade holder comprises an integrated upper, somewhat springy clamp 5 which, in turn, includes a tensioning roller 6 which is brought to press onto and hence, firmly clamp the cutting insert 4.

A double-headed insert 4 is shown in the figure, which feature a cutting edge 7, 7' in either direction. This improves cutting economy by allowing the insert to be turned half a revolution when the one edge is worn out. The invention is not, however, limited to the use of double-edge cutting inserts, but even inserts with only one cutting edge can be taken into consideration. There should, however, be an abutment 8 at the end side of the slot 3 to enable the cutting insert to achieve a well-defined radial position. Further, the cutting insert can exhibit a substantially V-shaped groove 9 on its lower side, which is brought to abut against a corresponding, substantially V-shaped rib 10 in the slot. Corresponding ribs and grooves can also exist on the short sides 11 of the cutting insert and abutment 8 of the slot. These cooperating ribs and grooves can also be inverted, such that the ribs are replaced by grooves and grooves replaced by ribs. The cross section need not be substantially V-shaped but can, for example, be formed as a segment of a circle. The abutment surface 8 and the side of the insert 11 can also be wholly plane.

The tensioning roller 6 (FIGS. 1–3) has the shape shown in FIGS. 10A–10C. In principle, it has the form of two truncated identically shaped cones, the bottom surfaces of which abut against each other, wherein a segment is cut-away, such that a planar surface 12 is created. Further, the tensioning roller features a central recess 19 to enable the roller to be rotated with a suitable tool, such as an Allan key to change the rotary position of the roller. The two side surfaces of the conical parts 13 are brought to abut partly against an opposing, rounded essentially V-shaped surface in the recess 14 of the upper clamp, and partly against an essentially V-shaped groove 15 (FIG. 5) on the upper side of the cutting insert.

Figure 2:
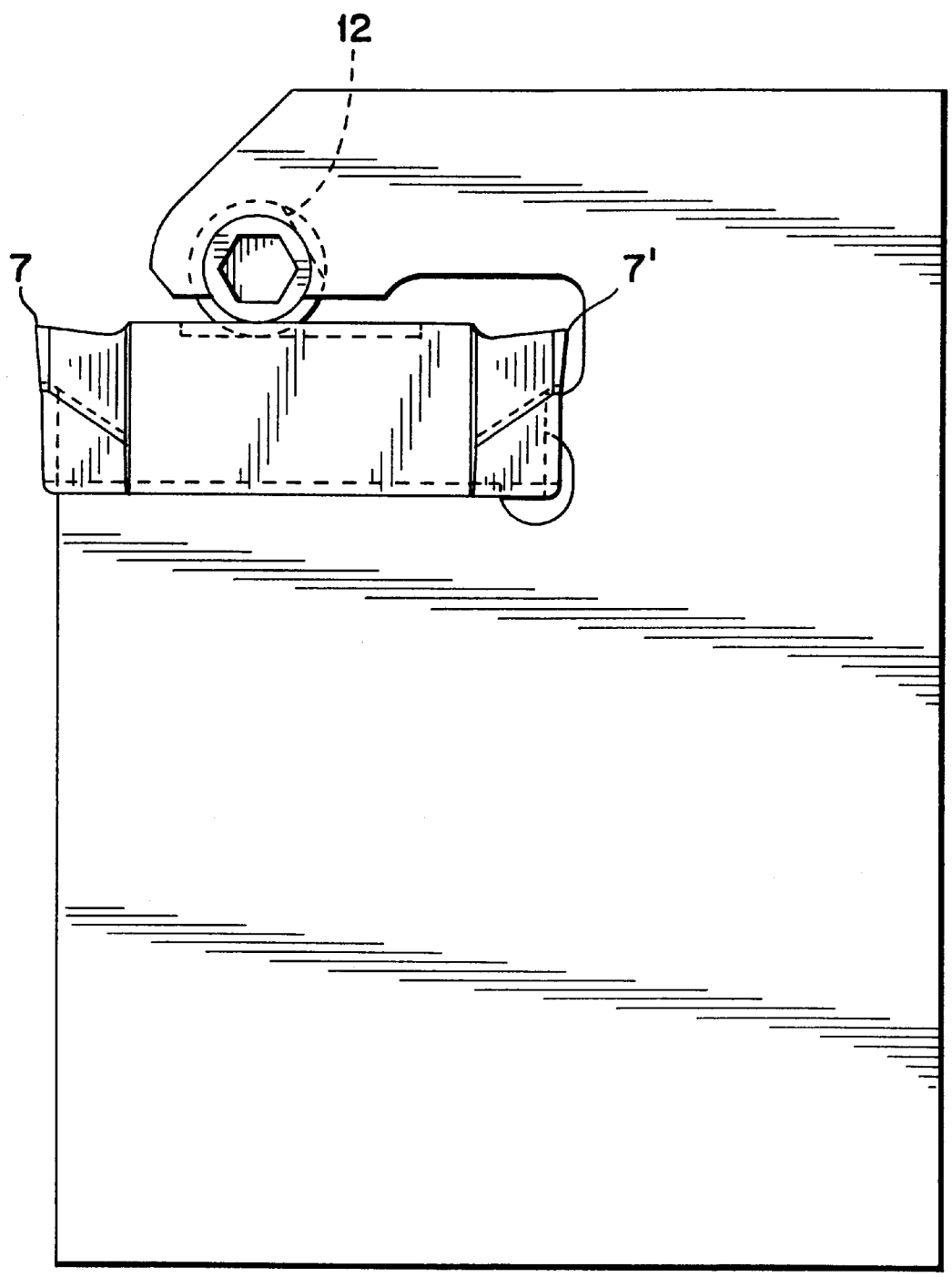
FIG. 2 shows the clamping device depicted in FIG. 1, straight from side.
Figure 3:
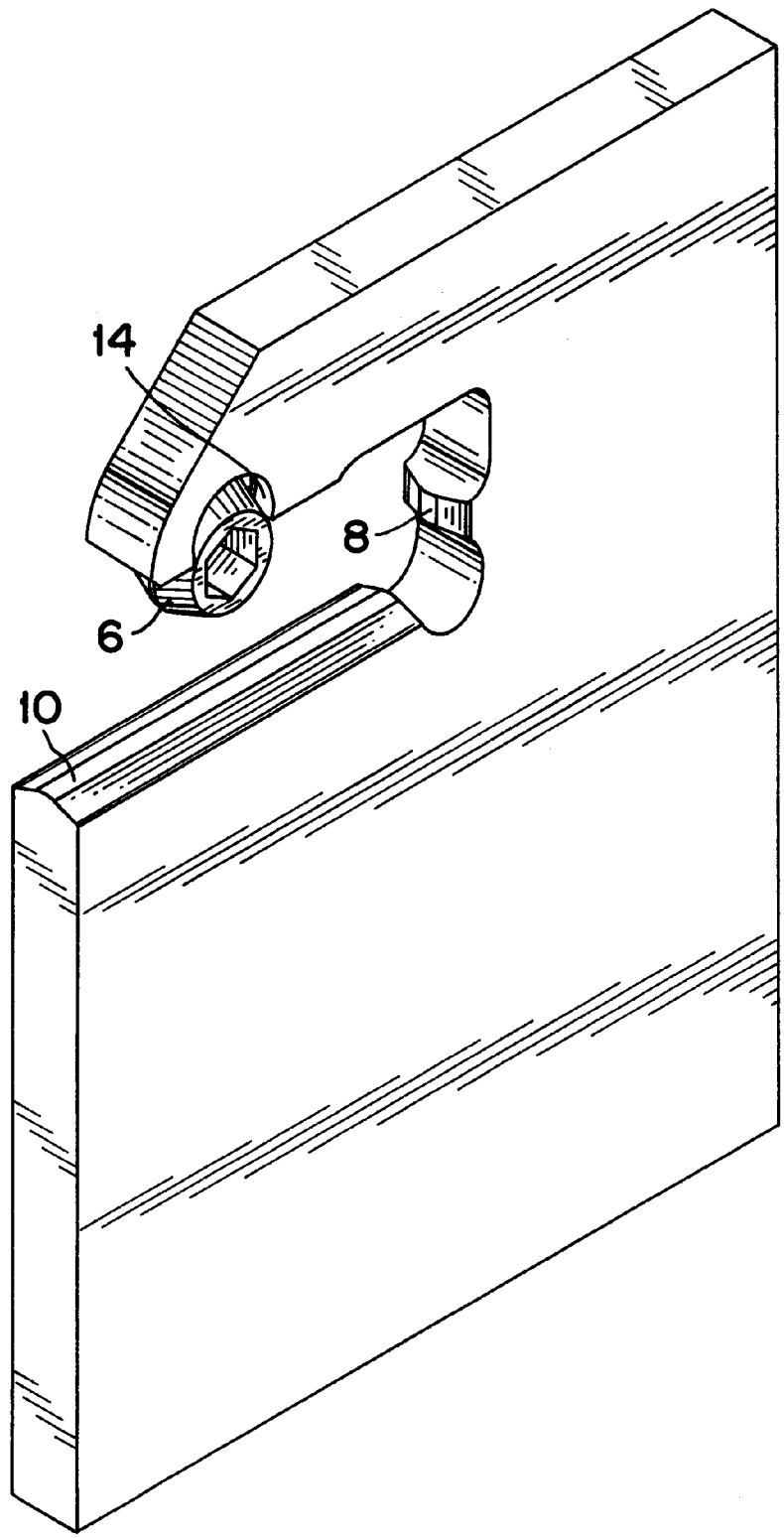
FIG. 3 depicts the mounting of the clamping roller in the device according to FIG. 1 in perspective obliquely from above.

A tensioning roller with a shape according to FIGS. 10A–10C can also be brought into engagement with cutting inserts with other shapes such as those shown in FIGS. 1, 2 and 5. Consequently, the upper side of the cutting insert can exhibit two cavities 16 as shown in FIGS. 6–7, wherein the cross-section of the cavities essentially agree with that of the tensioning roller. Only one cavity is required for an insert with one cutting edge. Further, the same type of tensioning roller can be brought into engagement with cutting inserts according to FIGS. 8, 9. The upper side of these inserts slope from both ends downwardly towards a lower part of the center of the upper side. The upper side shows a substantially V-shaped groove, the cross section of which is in agreement with the shape of the tensioning roller.

Figure 4:
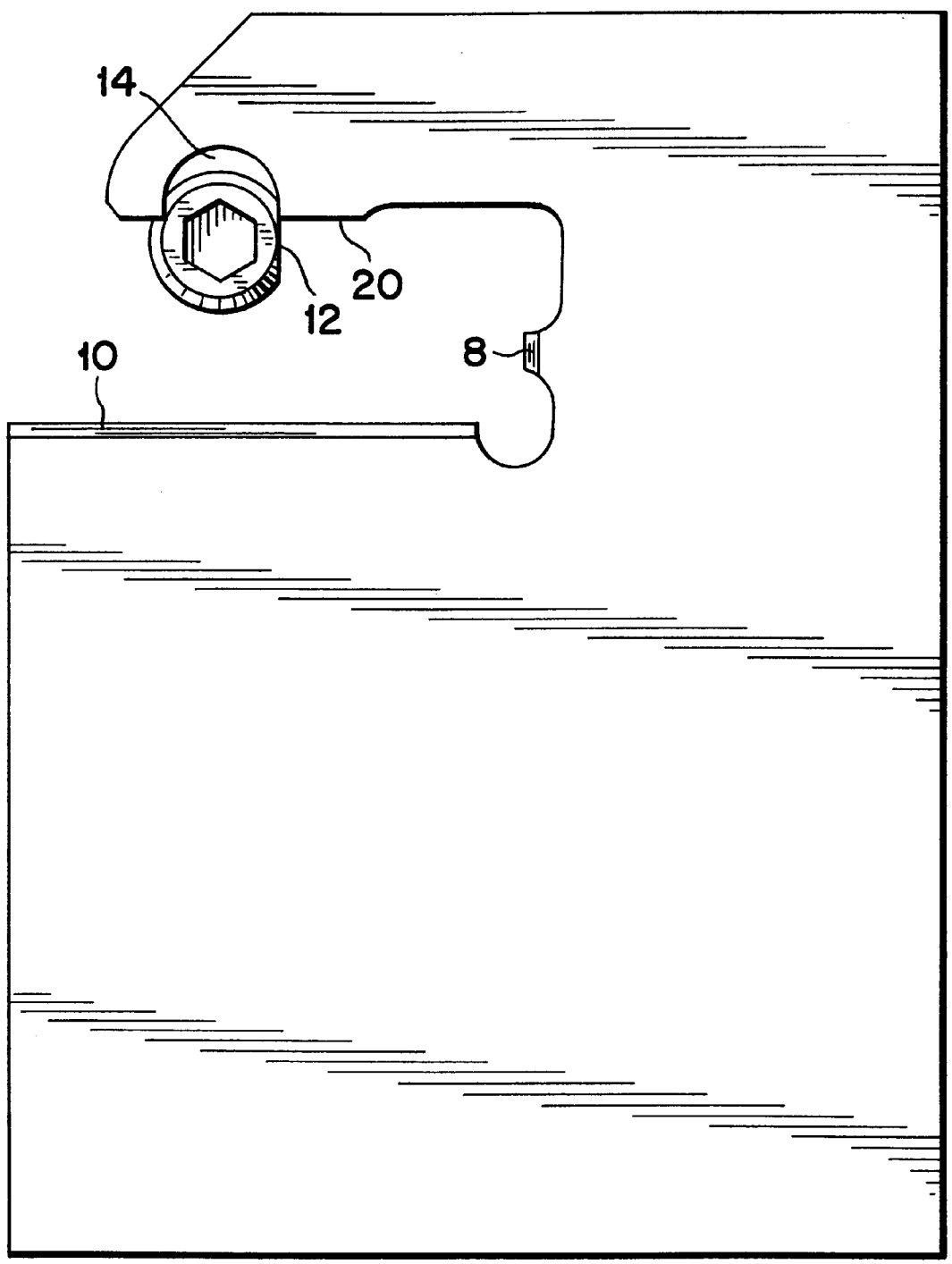
FIG. 4 depicts the assembly of the clamping device according to the design in FIG. 3, straight from the side.

When the roller is to be installed, it must be rotated so that the planar surface 12 is in principle vertical, i.e., at a right angle to the upper limiting surface 20 of slot 3. Subsequently, the roller is pressed into recess 14 from below (FIGS. 3, 4) which can be accomplished completely without resistance or by overcoming a light clock action. Once the roller has been placed in position in the recess 14, the roller can be rotated in either direction to a rotary position in which the planar surface 12 takes-up a position other than the vertical and thus the roller is locked in recess 14.

When an insert is to be installed in the insert seat, the tensioning roller is first rotated so that the planar surface 12 is brought to lie straight downwards, i.e., substantially planar parallel with surface 20. The roller is thereby released from the insert 4 which can then be moved into contact with contact surface 8. The tensioning roller is then rotated so that its side surfaces 13 are brought to press against the groove 15 in the upper side of the insert. By rotating the insert anticlockwise (FIG. 2), the insert is also brought into distinct contact with the rear contact surface 8. When the insert is to be released, the tensioning roller is turned clockwise (FIG. 2), until the planar surface 12 faces downwardly toward the upper surface of the insert. Play between the insert and roller is then re-established, whereby the insert is free and can be pulled out of the slot. It should be noted that, no contact occurs between the insert and the upper limiting surface 20 of the slot.

The tensioning roller can be of various other shapes than those shown in FIGS. 10A–10C, whereby the only limitations are that the roller is locked axially and in the recess 14 which is matched to the shape of the roller, and to further enable the roller to be clamped to an insert. A tensioning roller with a substantially V-shaped groove around the surface on the sides of the conical parts 21 (FIGS. 11A–11C), whereby the recess 14 for the clamp and the upper side of the insert have corresponding ribs. The tensioning roller will come to lie against the insert and recess with its two flank surfaces 22. In this situation, the middle surface 23 of the insert is free of contact with any other surface. The roller can be designed with a central groove 24 (FIGS. 12A–12C) substantially with the shape of a segment of a circle in its casing surface. Thereby the insert respectively the recess can be shaped with the corresponding central, rounded rib.

Figure 13A:
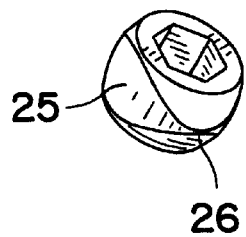
FIGS. 13A, 13B show an additional embodiment of a tensioning roller according to the present invention.
Figure 13B:
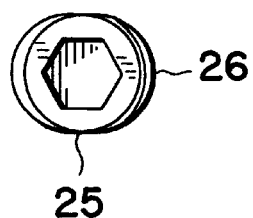

Tensioning rollers (FIGS. 10–12) are, if one excepts the planar surface 12, rotatationally symmetrical. In order to facilitate clamping and give a gradually increasing counter torque for the tensioning roller, they can however be shaped with an asymmetrical contact surface, for example with increasing radius. Thus a tensioning roller is shown with chamfered side walls of the conical sections (FIGS. 13A, 13B), which flow out into clamping parts 26, the contact of which against the upper side of the insert means maximum clamping force.

Figure 14:
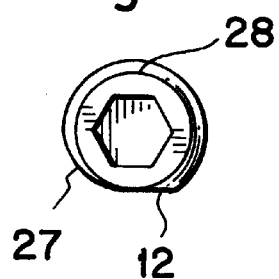
FIG. 14 depicts a further embodiment of the tensioning roller according to the invention.

FIG. 14 shows a tensioning roller with a "tension intensifying" part 27 which gives a step-free clamping from a tension-free condition, when the planar contact surface 12 faces towards the insert, to the position where maximum clamping effect is achieved when the round contact surface 28 has constant and maximum radius.

Figure 15A:
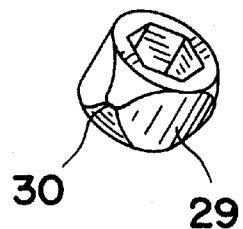
FIGS. 15A, 15B shows yet a further embodiment of the tensioning roller according to the present invention.
Figure 15B:
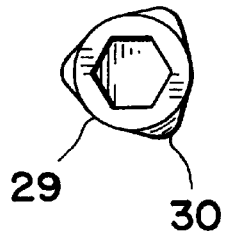

FIGS. 15A, 15B illustrate a further design with chamfered surfaces on the side surfaces of the conical areas, more specifically three chamfered surfaces 29. These are slightly convex and have their parts with the smallest radius at the middle of the chamfered surface. They connect with each other via part 30 at the maximum radius. When the part 30 has been rotated so that it lies in contact with the insert, maximum clamping force has been achieved. At the part with minimum radius, the roller runs free from the insert.

The actual blade holder is normally produced in a suitable steel, such as tool steel. The roller can be manufactured in, e.g., hardened steel, high-speed steel or cemented carbide.

Through the invention of the tension roller 6, a number of advantages have been achieved. A very large number of installations and removals of inserts can be carried out without any wear occurring on the insert seat, which otherwise would have necessitated a change of blade holder. If, for some reason the roller should be damaged, only an exchange needs be made, not the entire blade holder.

What is claimed is:

1. An arrangement adapted for the fastening of a cutting insert, comprising a generally blade-shaped holder forming a forwardly open slot, the slot including vertically spaced sides facing one another for receiving a cutting insert therebetween; one of said sides including a recess opening into the slot to form an opening which communicates the recess with the slot, and a tensioning roller mounted in the recess for manual rotation about an axis to change a rotary position thereof; the roller being configured to permit insertion/removal of a cutting insert when the roller is in at least one rotary position and to clamp an insert in place when the roller is in another rotary position; the roller and the recess being configured to permit insertion and removal of the roller through the opening in a direction perpendicular to the axis with the roller in a particular rotary position with respect to the opening; an outer surface of the roller and a surface of the recess having matching male and female shapes, respectively, for preventing relative movement between the roller and the holder in the direction of the axis; the female shape receiving the male shape in response to insertion of the roller through the opening in the direction perpendicular to the axis.

2. An arrangement according to claim 1, whereby the tensioning roller has a planar surface defining the at least one rotary position.

3. An arrangement according to claim 1, the roller having a double-conical shape forming a largest diameter at a center of the roller.

4. An arrangement according to claim 1, the roller having a groove extending circumferentially at a center of the roller.

5. An arrangement according to claim 4, the groove having a generally V-shaped cross section.

6. An arrangement according o claim 4, the groove having a generally circular-shaped cross section.

7. An arrangement according to claim 1, wherein the roller includes an outer peripheral portion having a gradually increasing radius.

8. An arrangement according to claim 1, wherein the sides of the slot constitute upper and lower sides, the recess disposed in the upper side.

9. A method of fastening an insert in a generally blade-shaped holder, comprising the steps of:

A) inserting an insert rearwardly into a forwardly open slot formed in the holder, whereby the insert passes between vertically spaced first and second sides of the slot and abuts a forwardly facing abutment surface located at a rear end of the slot, and while a tensioning roller mounted for manual rotation in the first of the sides is in a first rotary position; and B) rotating the roller about the axis into another rotary position wherein the roller engages the insert to clamp the insert against the second of the sides and simultaneously push the insert rearwardly into firm contact with the forwardly facing abutment surface, to orient a cutting edge of the insert parallel to the axis.

10. The method according to claim 9 including prior to step A, the step of inserting the roller vertically into the recess in a direction perpendicular to the axis while a flattened portion of an outer periphery of the roller is oriented perpendicular to the slot, and then rotating the roller to the at least one rotary position wherein the flattened portion is oriented generally parallel to the slot.

* * * * *